(12) United States Patent
Korzen

(10) Patent No.: US 8,198,748 B1
(45) Date of Patent: Jun. 12, 2012

(54) MAGNETICALLY LEVITATED LINEAR BARREL GENERATOR

(75) Inventor: Victor Korzen, Chicago, IL (US)

(73) Assignee: Victor Korzen, Chicago, IL (US)

( * ) Notice: Subject to any disclaimer, the term of this patent is extended or adjusted under 35 U.S.C. 154(b) by 718 days.

(21) Appl. No.: 12/292,363

(22) Filed: Nov. 14, 2008

(51) Int. Cl.
H02P 9/04 (2006.01)

(52) U.S. Cl. .......................... 290/55; 290/44

(58) Field of Classification Search .......... 290/44, 290/55
See application file for complete search history.

(56) References Cited

U.S. PATENT DOCUMENTS

| | | | |
|---|---|---|---|
| 6,249,058 B1 * | 6/2001 | Rea | 290/55 |
| 6,270,308 B1 * | 8/2001 | Groppel | 415/4.3 |
| 7,425,776 B2 * | 9/2008 | Ketcham | 290/55 |
| 7,816,802 B2 * | 10/2010 | Green | 290/55 |
| 2010/0133838 A1 * | 6/2010 | Borgen | 290/52 |

* cited by examiner

Primary Examiner — Thanh Lam

(57) ABSTRACT

A barrel type, or squirrel cage type wind generator that pairs two fundamental and separate features. The first being its tapered squirrel cage construction that is magnetically suspended above the turbine's bottom stator and thereby eliminates friction and wear normally associated with bearings. Its bearing-less levitation avoids overheating, increases efficiency, and facilitates extended use at high speeds.

The second is the electromagnetic interconnection between the rotor and the stator that utilizes both the configuration of a linear generator situated along the perimeters of the upper and lower stators and two hydroelectric-type drag-control generators attached to the upper and lower spindles.

Version of this Turbine may also utilize (a) the principles of the Mini-Romag's "magnetic current" to support generating electrical power, (b) variable resistance coreless coils to overcome "start-up drag", and (c) CAD-optimized aerogel-based blades featuring renewable energy generating coating.

The above described patentable both design and its features considerably reduce the costs, size, and complexity found in conventional wind turbines.

This unique Magnetically Levitated Linear Barrel Generator allows for smaller, lighter, cost-effective, and easy to install renewable resource generator on rooftops, on existing water-tank towers, and within the telecommunication lattice towers.

8 Claims, 7 Drawing Sheets

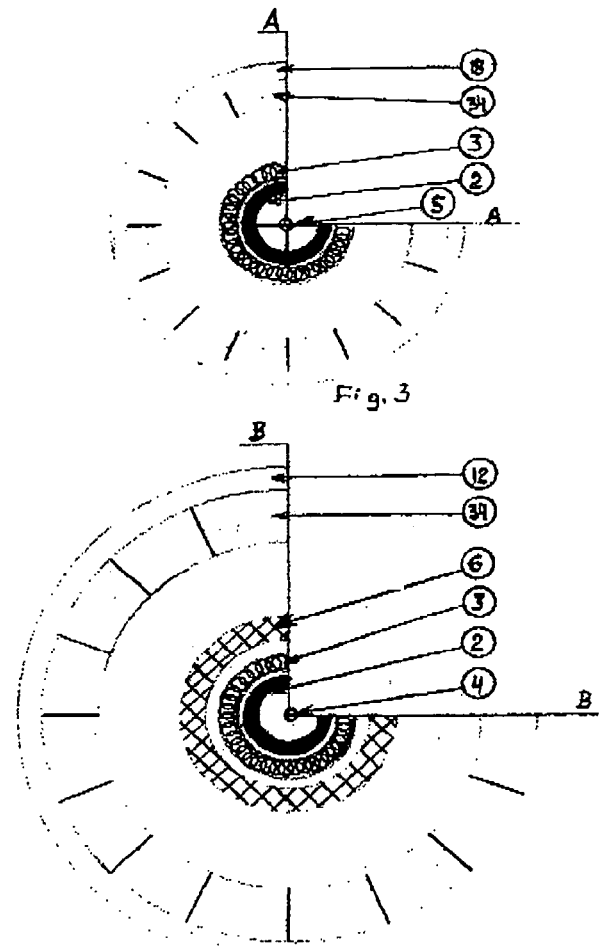

Legend

1. Blades Current Collector
2. Drag-Control/ Romag generator
3. Coreless coils
4. Bottom spindle
5. Top spindle
6. Lower levitation magnet ring
7. Upper levitation magnet ring
9. Rotor pole shoes
11. Support posts fixed to annular stationary stators
12. Bottom stator
13. Lower rotor
14. Blade/ rotor assembly
16. Upper rotor
18. Top stator
31. Rotor magnets
32. Salient pole shoes
34. Armature windings

MAGNETICALLY LEVITATED LINEAR BARREL GENERATOR

BACKGROUND OF THE INVENTION

Wind generators have been designed, developed and implemented for the last six decades, including windmills in the Netherlands and Germany, to windmills in the farms of the United States since the early 1900s. More recently, windmill generators have been installed in the wind tunnels of Texas and the wind tunnels of the desert plains East of Los Angeles, Calif. These have largely taken the form of three bladed propeller-type devices with long radial blades.

More recently, the windmill generators have been improved and have taken the design of those in the following patents.
- U.S. Pat. No. 7,446,447 issued Nov. 4, 2008
- U.S. Pat. No. 7,432,610 issued Oct. 7, 2008
- U.S. Pat. No. 7,425,786 issued Sep. 16, 2008
- U.S. Pat. No. 7,425,776 issued Sep. 16, 2008
- U.S. Pat. No. 7,394,178 issued Jul. 1, 2008

SUMMARY OF THE PRESENT INVENTION

According to the present invention, barrel-type, or squirrel cage-type wind generator is provided that pairs two fundamental and separate features. The first being its tapered squirrel cage construction that is magnetically suspended above the turbine's bottom stator and thereby eliminates friction and wear normally associated with bearings. Its bearing-less levitation avoids overheating, increases efficiency, and facilitates prolonged use at high speeds.

The second is the electromagnetic interconnection between the rotor and the stator that utilizes both the configuration of a linear generator situated along the perimeters of the upper and lower stators and two hydroelectric-type drag-control generators attached to the upper and lower spindles.

Version of this Turbine may also utilize (a) the principles of the Mini-Romag's "magnetic current" to support generating electrical power, (b) variable resistance coreless coils to overcome "start-up drag" and (c) CAD-optimized aerogel-based blades featuring renewable energy generating coating.

Other objects and advantages of the present invention will appear more clearly from the following detailed description.

BRIEF DESCRIPTION OF THE DRAWINGS

FIG. 3 is a bottom view of the top stator through section A;

FIG. 4 is a top view of the bottom stator through section B;

DETAILED DESCRIPTION OF THE PREFERRED EMBODIMENT

Figure 1:
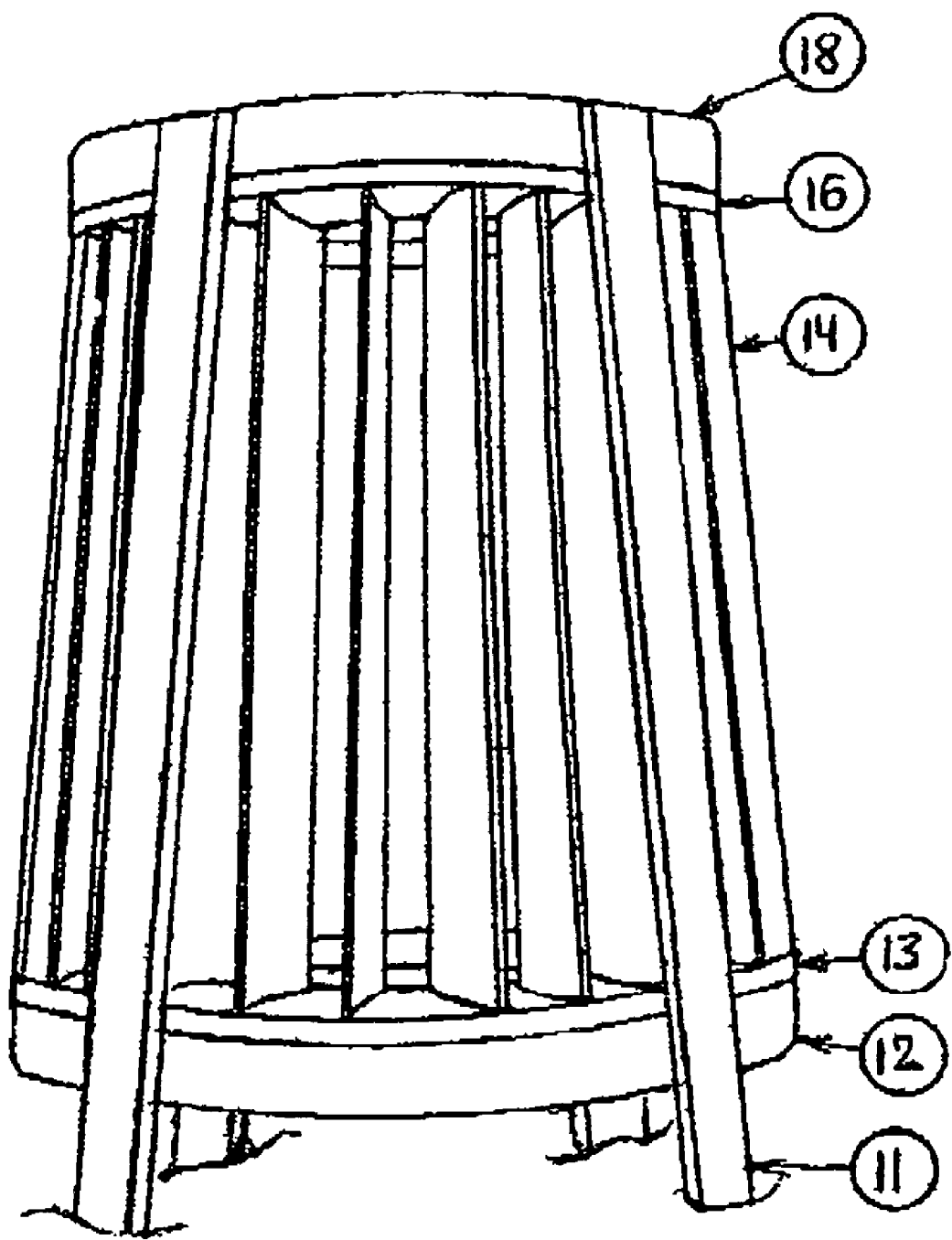
FIG. 1 is a perspective view of the present Magnetically Levitated Barrel Generator.

Referring to the drawings and initially FIG. 1, the presented here Magnetically Levitated Barrel Generator is designed of four supporting posts 11 holding two annular stationary stators 12 and 18 that cooperate with a closely spaced annular rotatable rotors 13 and 16.

Those rotors are connected with each other by a plurality of frustum-conically arranged curved blades 14. The blades 14 support and carry an upper rotor 16 that cooperates with a stationary annular top stator 18. At the bottom, blades carry the lower rotor 13 that cooperates with a stationary annular bottom stator 12. Both the top and bottom stators generate electricity as wind rotates the blade assembly 14.

The presented here technology combines two linear generators in one turbine situated along the perimeters of the stators, magnetic levitation of the blades/rotor assembly, renewable energy generating blades, Blades Current Collector 1, and two Drag-Control/Romag generators 2.

Figure 2:
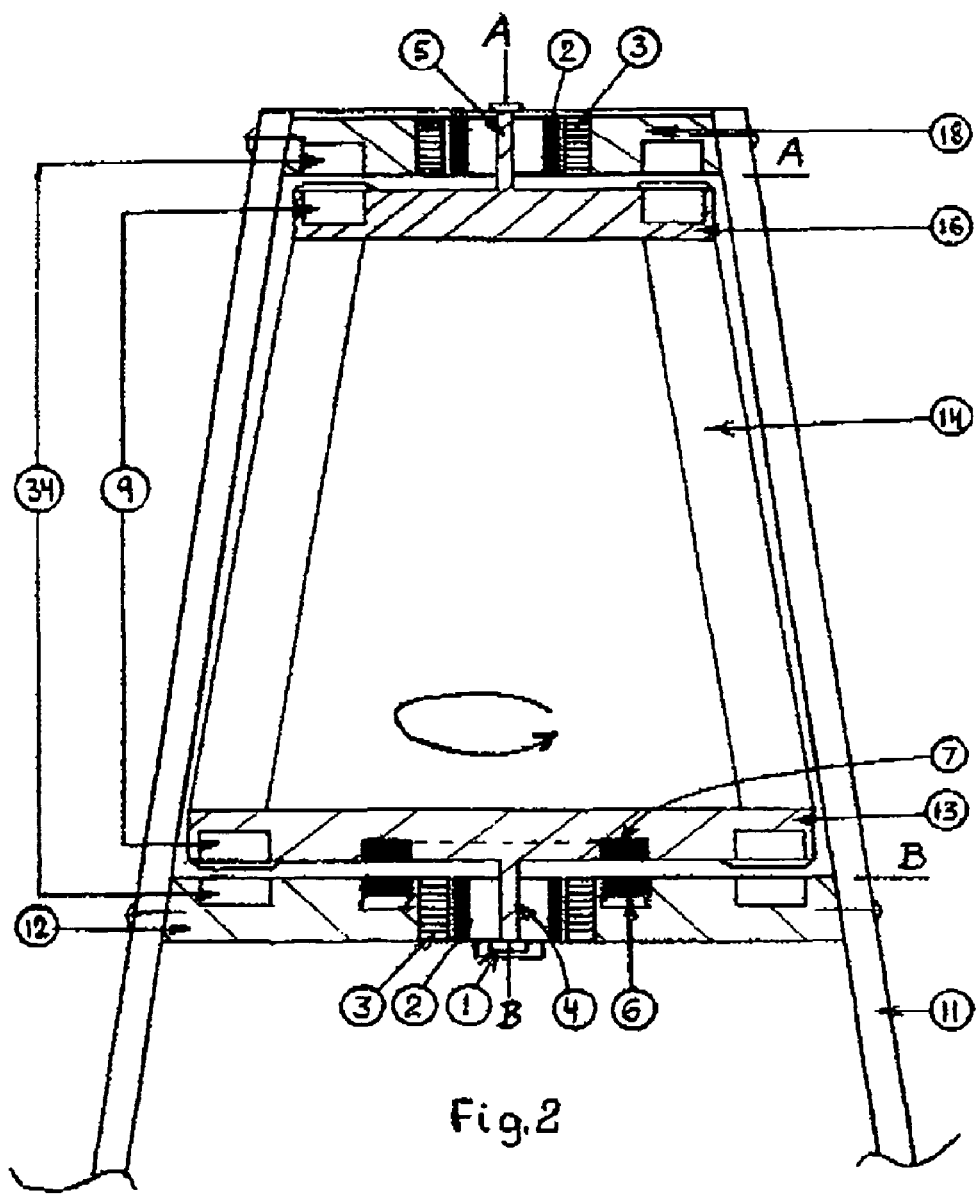
FIG. 2 is a cross-section view of the whole turbine showing the top and bottom of the linear generator, levitation magnetic rings, centering spindles of the turbine, a cross-section of the Drag-Control/Romag generators, and Blades Current Collector.

Shown in FIG. 2, two of the pictured above generators are attached respectively to the top 5 and bottom 4 spindles and serve in this turbine as a drag-control generators 2 that reduce the start-up drag, control the rotor's speed, and generate extra electricity. The stators of the drag-control generators 2 utilize coreless coils 3 that do not generate electricity and/or drag until they are turned ON. Programmed and controlled remotely, those coreless mini-generators generate extra electricity at the high speed of the rotor, and slow down (brake) its velocity in high winds.

Moreover, those drag-control generators 2 can also be utilized as Mini-Romag free energy generators. (The Mini-Romag free energy generator uses the principle of moving magnetic flow named "the magnetic current" for generating electrical power. It is able to produce about 24 Watts of free electricity while it generates sufficient power to sustain itself revolving.)

As seen in FIG. 2, the magnetic levitation is achieved by the set of two Neodymium magnetic rings, the lower one, numbered 6, is concentrically imbedded in the bottom stator and is axially aligned with the upper one, numbered 7, housed at the base of the lower rotor. Automatically, self-generated repulsive forces between these magnet rings hold the blade assembly barrel levitated in a fixed position. The height of the horizontal level of the lower magnetic ring 6 is adjustable by ability to turn it clockwise or counterclockwise (like a screw) within a threaded notch in which the lower magnetic ring 6 is embedded.

The ability to move the lower magnetic ring 6 up and down permits the whole blade assembly barrel to be lifted and/or lowered to precisely calibrate the distance between the rotor pole shoes 9 and armature windings 34 located within the stators 12 and 18. The said upper and lower magnetic rings provide the levitation for the presented here barrel generator.

The rotor has no bearings and no gear box. Horizontal stability of the rotors is secured by the top 5 and bottom 4 spindles being axially located fixed parts of the upper rotor 16 and lower rotor 13.

The upper rotor and stator assembly 16 and 18 is purposely smaller in diameter than the lower stator and rotor assembly 12 and 13 to prevent a slide or wobble effect and to use the dimensions of the upper assembly as a lower assembly of the next smaller turbine model. E.g. the upper assembly of the 750 kW turbine can serve as a lower assembly of the 500 kW turbine, and on.

Figure 5:
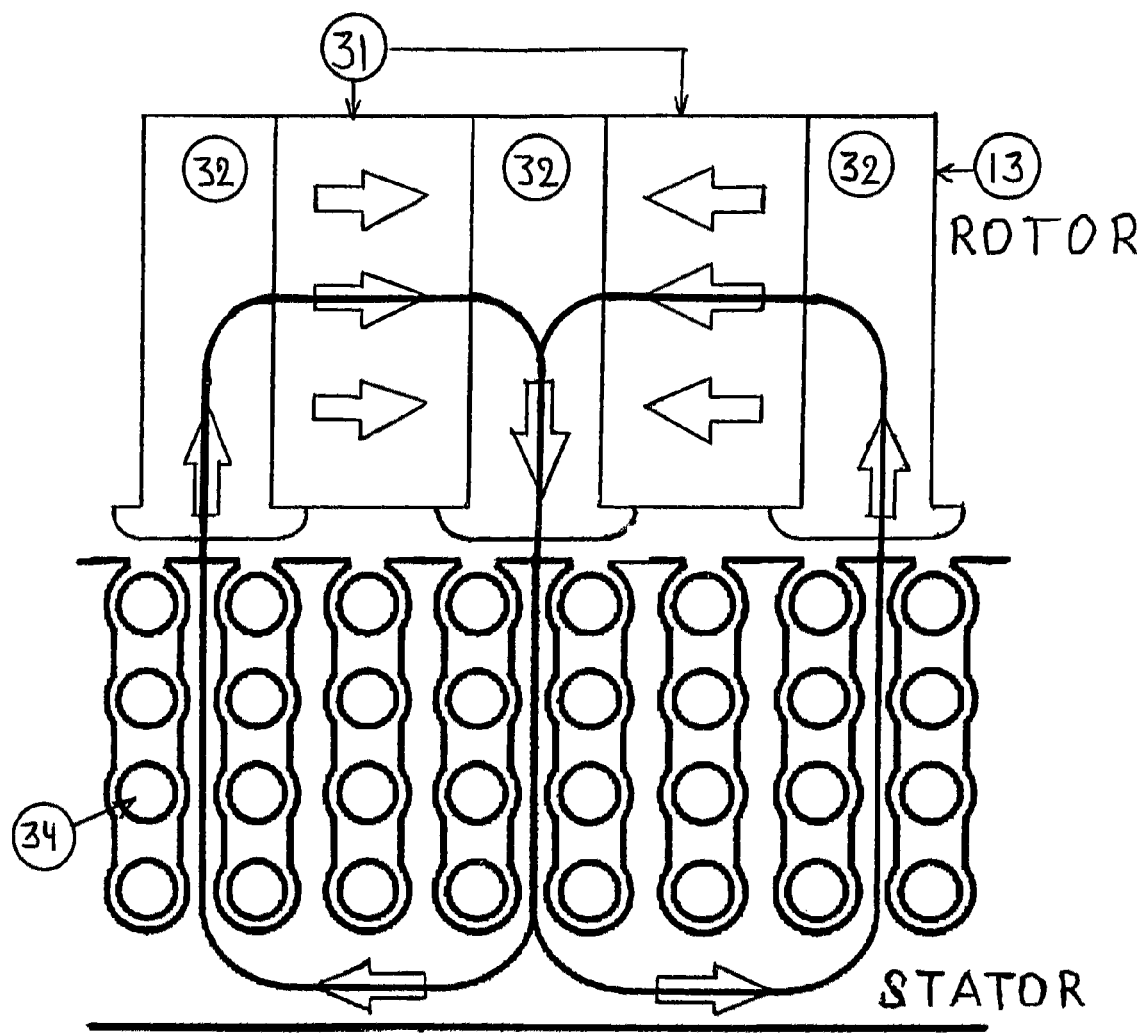
FIG. 5 is a cross-section through the windings and plates of the rotor and stator of both the top and bottom shoe and teeth of the generator.

The presented here barrel wind turbine features two linear-type generators, each of them containing a stator and rotor. There is plurality of coil windings, preferably seventy two up to three hundred, embedded in each stator 12 and 18 aligned with seventy two up to three hundred magnets embedded in each rotor 13 and 16 respectively. So, the total of 144-600 magnets and 144-600 coils may be in use. FIG. 5 illustrates a fragmentary portion of the rotor magnets cooperating with stator windings. The rotor includes permanent magnets 31 mounted between the steel pole shoes 32 that serve as conductors of the magnetic flux. Magnets and pole shoes are housed in the upper 16 and lower 13 rotors of the barrel blade assembly 14. Since a large number of poles is required to produce rated frequency, a rotor with salient poles is used in this application. Also considered for this rotor are the damper windings (amortisseurs) in the form of copper or brass rods embedded in the pole face to dampen out speed oscillations.

Figure 6:
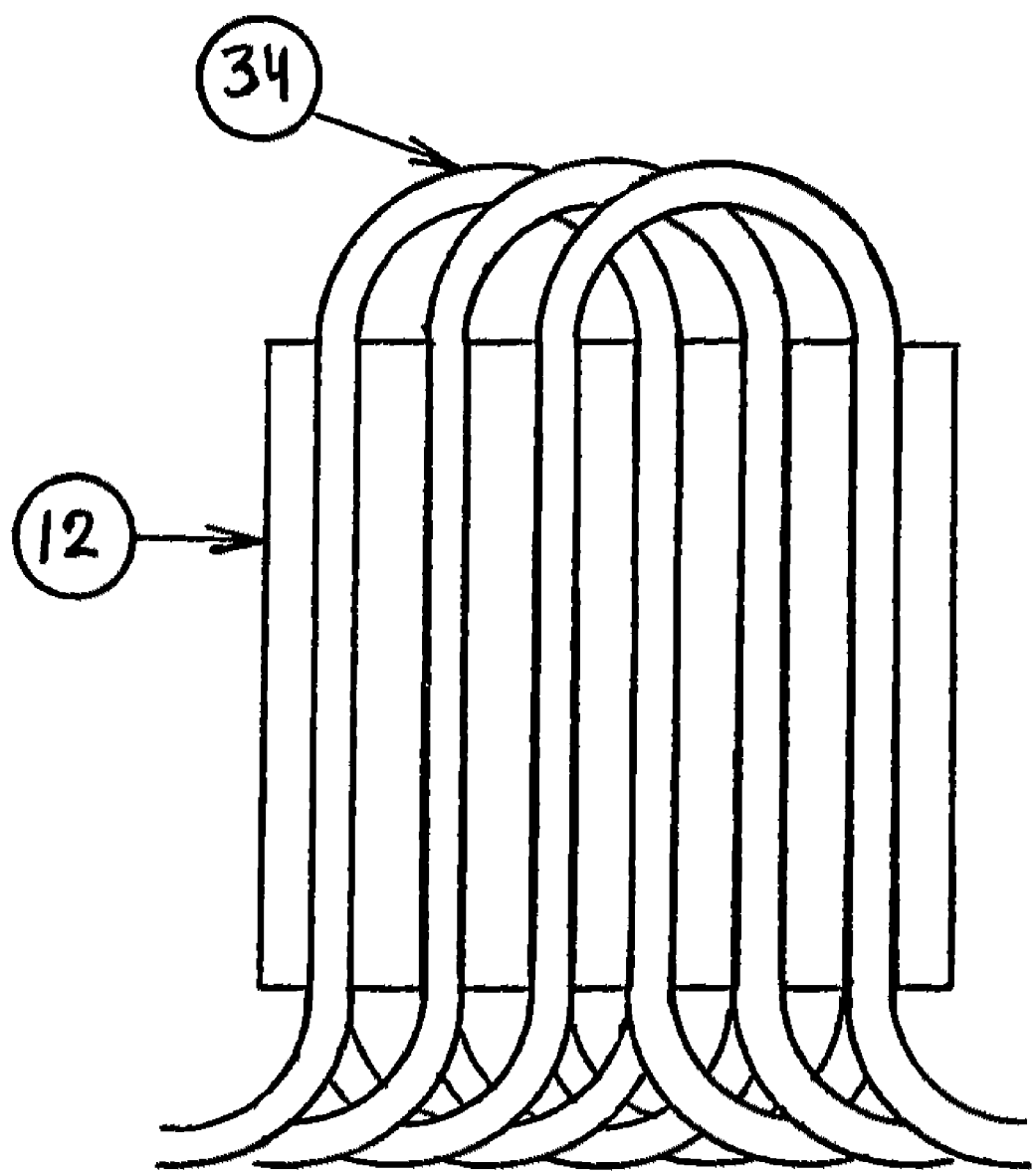
FIG. 6 is a cross-section of the stator wiring design.
Figure 7A:
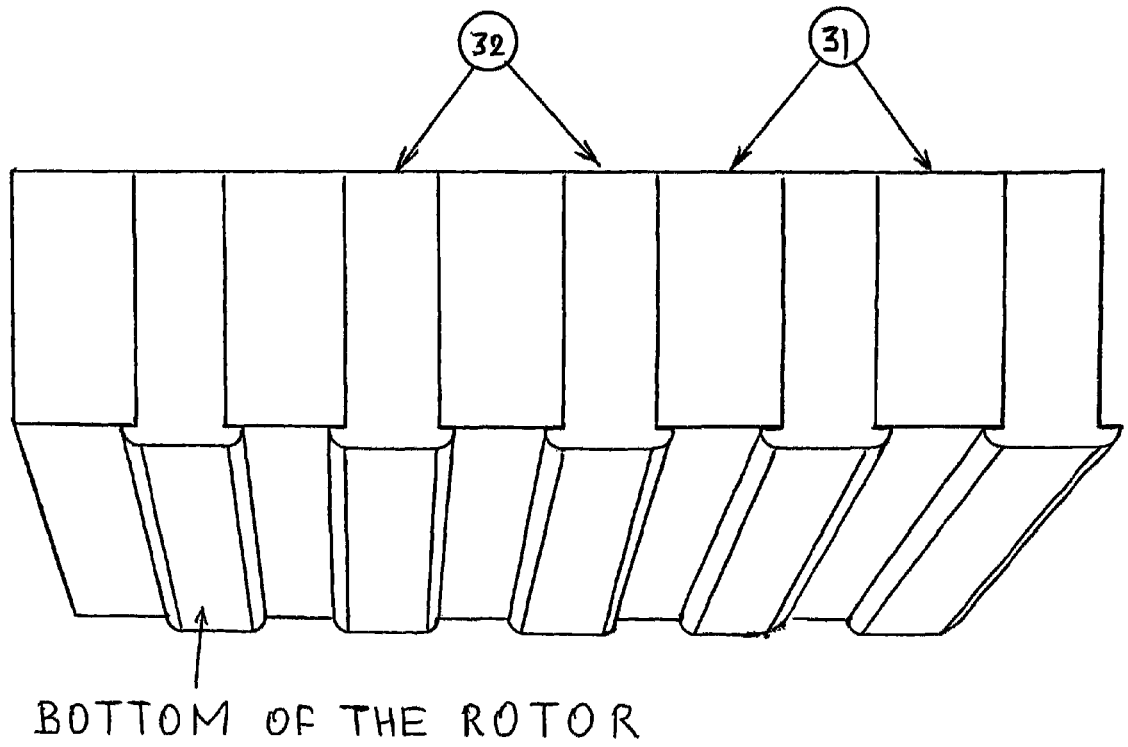
FIGS. 7a and 7b is a bottom view of one of the rotors showing the salient pole shoes and the magnets.
Figure 7B:
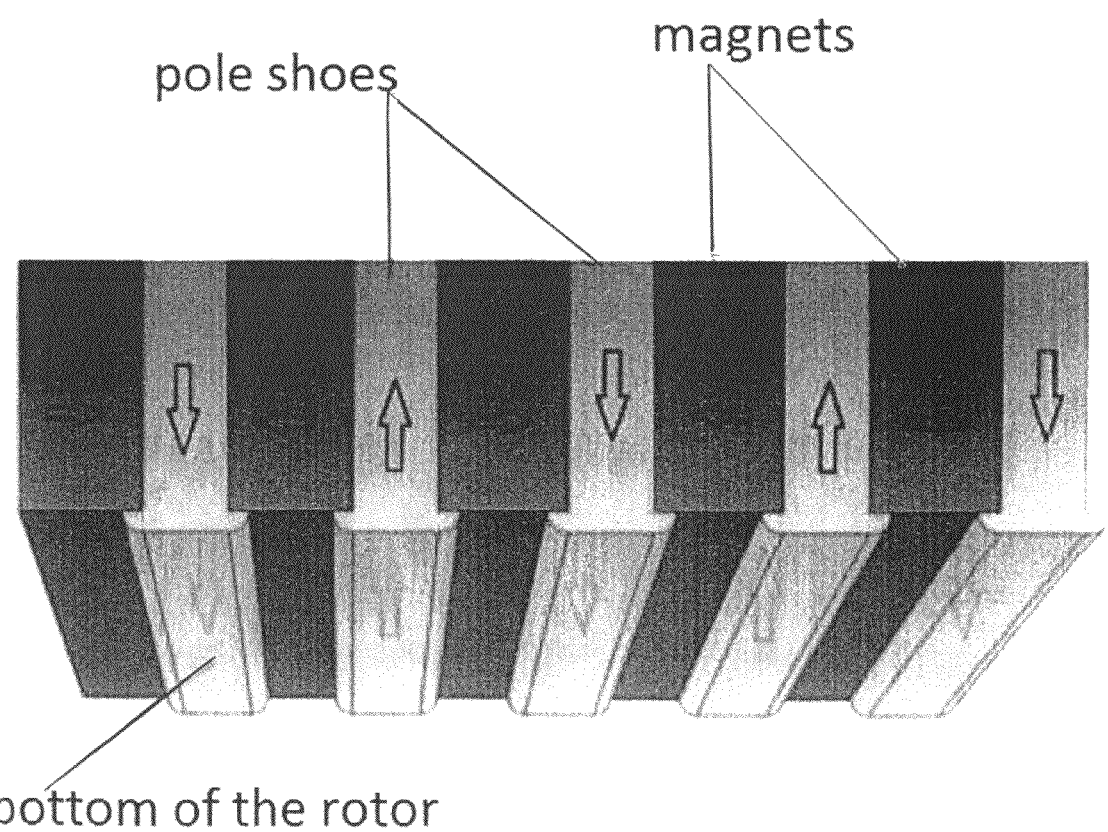

Shown in FIG. 5, both stators consist of coil windings 34 placed into a slotted laminated steel teeth located along the perimeter of the stator's main body. The conductors are power cables which are circular in cross-section. The stator winding is usually a two layer conventional lap-wound design composed of several parallel circuits, mutually phase shifted on intervals of eleven distance over one electric period, as shown in FIG. 6.

Shown in FIG. 5, the magnetic flux from a pole shoe 32 of the rotor passes the air gap, goes into the stator, crosses the coils 34 mounted in the slots, and returns to the adjacent pole shoe of the rotor. This way the magnetic flux completes a whole turn around the coil windings.

To emphasize a variant of the constant power production and a constant load on the rotor, a three-phase system with the phases mutually shifted $2\pi/3$ electrical radians is in favor.

Shown in FIGS. 3 and 4, this MagLev Barrel Generator also contains two Drag-Control/Romag generators 2 housed in the center of each stator. The rotors of the Drag-Control/Romag generators are attached to the top 5 and bottom 4 spindles. The coreless coils 3 of those generators are housed within the inner circular rim of the stators 12 and 18.

The bottom spindle of the blade assembly ends up with the Blades Current Collector. The slip rings of that Collector 1 are wired to the turbine blades surfaces generating renewable energy from the solar-sensitive blades coating.

Subject to a separate patent protection, the Barrel Generator Blades feature the most efficient aerodynamic shape and dimensions developed by means of CAD program of certain Aerospace Engineering Department and solar coating that will convert the warmth of the environment into additional energy generated by the MagLev Barrel Generator described in this patent application.

The invention claimed is:

1. A Magnetically Levitated barrel-shaped Vertical Axis wind generator with improved efficiency, comprising: a stationery stator, a rotor mounted for rotation relative to the stator and having a plurality of wind impacting blades thereon, said rotor and stator having interacting electrical generator elements, said blades being annularly arranged in squirrel cage fashion.

2. A wind generator with improved efficiency, as defined in claim 1, including a circular stationery stator at the top of the generator, a circular rotor at the top of the generator electrically cooperating with the top circular stationery stator, a circular stationery stator at the bottom of the generator, a circular rotor at the bottom of the generator electrically cooperating with the bottom circular stator, and said blades extending in annular array between the top rotor and the bottom rotor.

3. A wind generator with improved efficiency, as defined in claim 1, which utilizes the configuration of a linear generator with a large plurality of axial flux magnets and interconnecting coil windings placed along the perimeters of the horizontally situated said rotors and stators.

4. A wind generator with improved efficiency, as defined in claim 2, wherein the rotors contain and utilize the hydroelectric design of the Drag-Control/Romag generators attached to the spindles protruding from the rotors in their axial centers, and added to this generator to (a) reduce the start-up drag, (b) control the rotor's speed, and (c) generate extra electricity.

5. A wind generator with improved efficiency, as defined in claim 2, wherein the bottom rotor contains permanent magnetic ring to maintain a frictionless vertical levitated interconnection between each stator and rotor/blade assembly located directly above the axially aligned and repulsive permanent magnetic ring embedded in the bottom stator.

6. A magnetically levitated rotor/blade assembly, as described in claim 5, of which the spacing (air gap) between the stator and rotor can be calibrated by moving the bottom repulsive magnetic ring up and down within its bottom stator where the ring is housed.

7. A magnetically levitated rotor/blade assembly, as described in claim 5 and 6, made of extremely low-density aerogel-based material.

8. A wind generator with improved efficiency, as described in claim 1, which utilizes Thermo-Photo Voltaic coating on blades as additional source of renewable energy.

\* \* \* \* \*